United States Patent [19]

Doyle

[11] Patent Number: 4,885,084
[45] Date of Patent: Dec. 5, 1989

[54] NOZZLE/VENTURI WITH PRESSURE DIFFERENTIATING BYPASS

[75] Inventor: Lorin G. Doyle, Ashland, Ohio

[73] Assignee: Flint & Walling, Inc., Kendallville, Ind.

[21] Appl. No.: 209,828

[22] Filed: Jun. 22, 1988

[51] Int. Cl.⁴ .............................................. C02F 1/74
[52] U.S. Cl. .................................... 210/132; 137/494; 137/599.1; 210/221.2; 210/254; 261/66; 261/76; 261/DIG. 39; 261/DIG. 75
[58] Field of Search ............ 210/132, 202, 205, 221.2, 210/253, 254, 257.2, 420, 722, 758, DIG.13, 188; 55/226, 421; 137/494, 599.1; 251/82; 261/42, 43, 76

[56] References Cited

U.S. PATENT DOCUMENTS

| | | | |
|---|---|---|---|
| 2,087,887 | 7/1937 | Gesner | 210/278 |
| 2,237,882 | 4/1941 | Lawlor et al. | 210/722 |
| 2,322,166 | 6/1943 | Shaw | 137/210 |
| 2,543,813 | 3/1951 | Stover | 210/202 |
| 2,953,160 | 9/1960 | Brazier | 137/895 |
| 3,167,506 | 1/1965 | Fackler et al. | 210/722 |
| 3,178,260 | 4/1965 | Tirado | 210/758 |
| 3,193,989 | 7/1965 | Sebeste | 210/420 |
| 3,222,277 | 12/1965 | Joyce | 210/722 |
| 3,282,227 | 11/1966 | Nielsen | 210/221.2 |
| 3,421,625 | 1/1969 | Fritz | 210/120 |
| 3,649,532 | 3/1972 | McLean | 210/722 |
| 3,707,233 | 12/1972 | Lerner | 210/278 |
| 4,068,681 | 1/1978 | McNair et al. | 137/599.1 |
| 4,123,800 | 10/1978 | Mazzei | 366/150 |
| 4,129,502 | 12/1978 | Garrett et al. | 210/221.2 |
| 4,171,263 | 10/1979 | Roberts et al. | 417/181 |
| 4,178,134 | 12/1979 | Babish et al. | 210/278 |
| 4,246,922 | 1/1981 | Fredrick et al. | 137/599.1 |
| 4,301,009 | 11/1981 | Cook et al. | 366/150 |
| 4,317,731 | 3/1982 | Roberts, Jr. et al. | 210/758 |
| 4,430,228 | 2/1984 | Paterson | 210/722 |
| 4,488,571 | 12/1984 | Sladky | 137/494 |
| 4,491,551 | 1/1985 | Johnson | 261/76 |
| 4,634,560 | 1/1987 | Eckert | 261/76 |
| 4,659,463 | 4/1987 | Chandler et al. | 210/202 |
| 4,722,363 | 2/1988 | Allyn | 137/599.1 |
| 4,776,952 | 10/1988 | Burrows | 210/257.2 |
| 4,784,771 | 11/1988 | Wathen et al. | 210/257.2 |
| 4,790,944 | 12/1988 | Gordon et al. | 210/221.2 |

FOREIGN PATENT DOCUMENTS 0030733 6/1981 European Pat. Off. ............ 210/722

Primary Examiner—Richard V. Fisher
Assistant Examiner—Joseph Drodge
Attorney, Agent, or Firm—Edgar A. Zarins; Malcolm L. Sutherland

[57] ABSTRACT

A nozzle/venturi with a bypass for controlling the pressure differential and therefore the amount of air which is entrained into the fluid stream. The nozzle/venturi assembly is utilized in a filtering system for removing contaminants from a water supply. The nozzle/venturi assembly includes a nozzle/venturi with a water inlet, an air inlet and an outlet passage and a bypass valve with an adjustable passageway to control the fluid flow through the bypass. The bypass valve includes a diaphragm which is effected by the downstream pressure resulting in an adjustment of the pressure differential and a spring biased seal valve to control the pressure which will open the bypass. The nozzle/venturi assembly provides efficient and precise control of the pressure differential to ensure that a constant amount of air is entrained into the fluid stream through the entire pump cycle.

28 Claims, 2 Drawing Sheets

NOZZLE/VENTURI WITH PRESSURE DIFFERENTIATING BYPASS

BACKGROUND OF THE INVENTION

I. Field of the Invention

This invention relates to a system for removing contaminants from a water supply and, in particular, to a nozzle/venturi assembly for use in such a system to precisely control and maintain the amount of air which is entrained into the fluid stream during the complete cycle of the water system.

II. Description of the Prior Art

Systems for removing impurities such as iron, sulphur and man-made contaminants from a water supply have been developed and refined over the years in order to provide a safe and palatable water supply. Generally, these systems include chlorination and filtration of the water to remove the contaminants. However, many contaminants must first be oxidized to permit removal through filtration. As a result, several of the past known systems employ means for entraining air into the water stream to facilitate removal of the contaminants.

Several of the past known filtering systems utilize venturi assemblies to entrain the air into the fluid stream. The simple nozzle/venturi works well where the pressure differential is stable and a constant fluid flow through the nozzle is maintained. However, any variations and the amount of entrained air may not be enough for removal of the contaminants or may be too much for efficient operation of the system. As a result, bypass means were added to the nozzle/venturi to more accurately control the water/air mixture. The bypass may form a segregated portion of the nozzle with the nozzle/venturi mounted parallel thereto. However, such systems do not provide efficient diversion since both the bypass and the nozzle/venturi are disposed within the same chamber. The bypass has also been restricted by a diaphragm to continuously vary the fluid flow through the bypass. However, such systems are dependent upon the elastic properties of the diaphragm and true control of the entrainment process is not provided. The amount of flow through the bypass necessary to open the diaphragm will always be the same and cannot be varied from system to system or as the differential pressure varies. Thus, simple and accurate means of controlling the differential pressure necessary to open the bypass passageway are needed to provide efficient removal of contaminants from a water supply.

SUMMARY OF THE PRESENT INVENTION

The present invention overcomes the disadvantages of the past known nozzle/venturi assemblies for water filtering systems by providing a nozzle/venturi with a separate bypass having means for adjusting the differential pressure necessary for opening the bypass passageway.

The present invention for admitting a controlled quantity of air into a liquid flow of varying flow rates and pressures generally comprises a nozzle/venturi and a pressure differentiating bypass valve. The nozzle/venturi provides the means for entraining air into the liquid stream. The pressure differentiating bypass valve allows excess liquid flow to bypass the nozzle/venturi while also maintaining the proper nozzle/venture inlet/outlet pressure differential. The apparatus is designed for use in a water filtering system to control the amount of air which is entrained into the liquid stream for maximum filtering efficiency.

The nozzle/venturi with pressure differentiating bypass valve of the present invention preferably includes dual parallel flow paths, one incorporating the nozzle/venturi and the other incorporating the bypass valve. When the flow through the nozzle/venturi reaches its capacity, surplus liquid flows through the bypass valve. The liquid flow from the bypass and the nozzle/venturi are combined again prior to entering the filtering system. The bypass valve includes a poppet valve which is biased against the valve seat by a spring having a manually adjustable tension to adjust the fluid pressure necessary to open the poppet valve. The fluid which flows past the poppet valve flows to the flow path junction and also into a lower chamber to act upon a diaphragm. The diaphragm is connected to the poppet valve and as fluid pressure within the chamber increases the pressure on the diaphragm operates to close the poppet valve. Thus, the fluid pressure acting on the diaphragm causes an unbalanced condition keeping the poppet valve closed enough to allow the inlet pressure to increase sufficiently to create the needed pressure differential. The compressive force of the spring can be adjusted to vary the pressure needed to open the poppet valve and therefore the pressure differential within the system.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
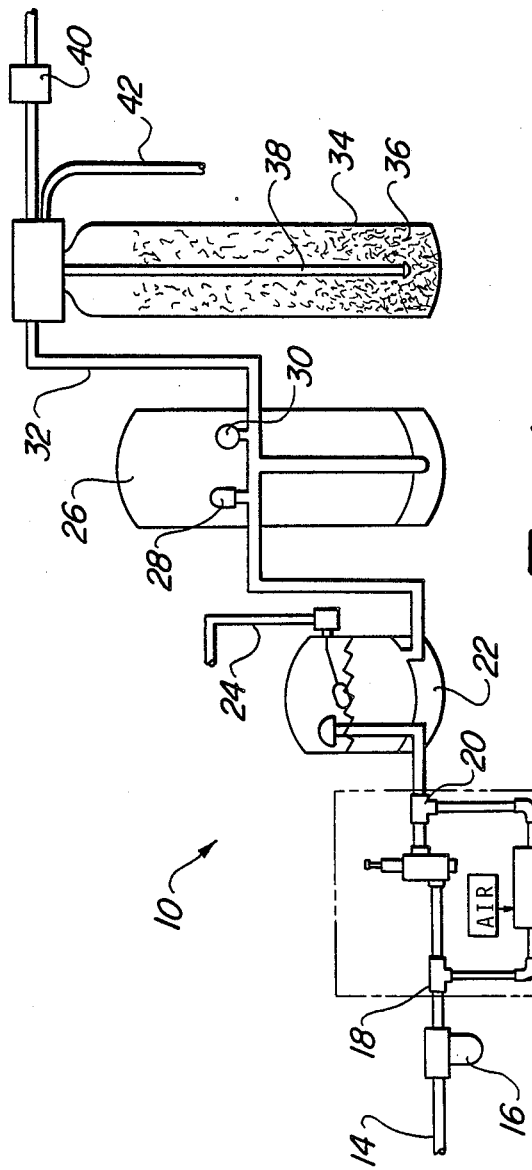
FIG. 1 is a diagrammatic illustration of a water filtering system incorporating the nozzle/venturi with pressure differentiating bypass valve of the present invention.
Figure 1A:
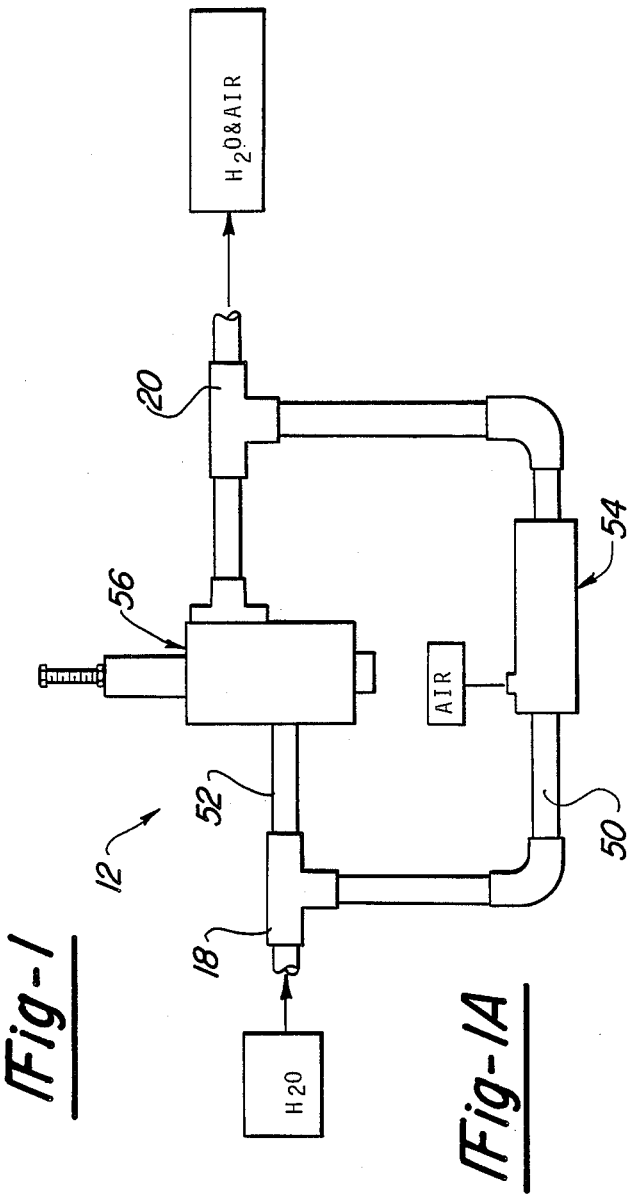
FIG. 1A is an enlarged perspective taken from FIG. 1 and showing the nozzle/venturi with pressure differentiating bypass valve embodying the present invention.
Figure 2:
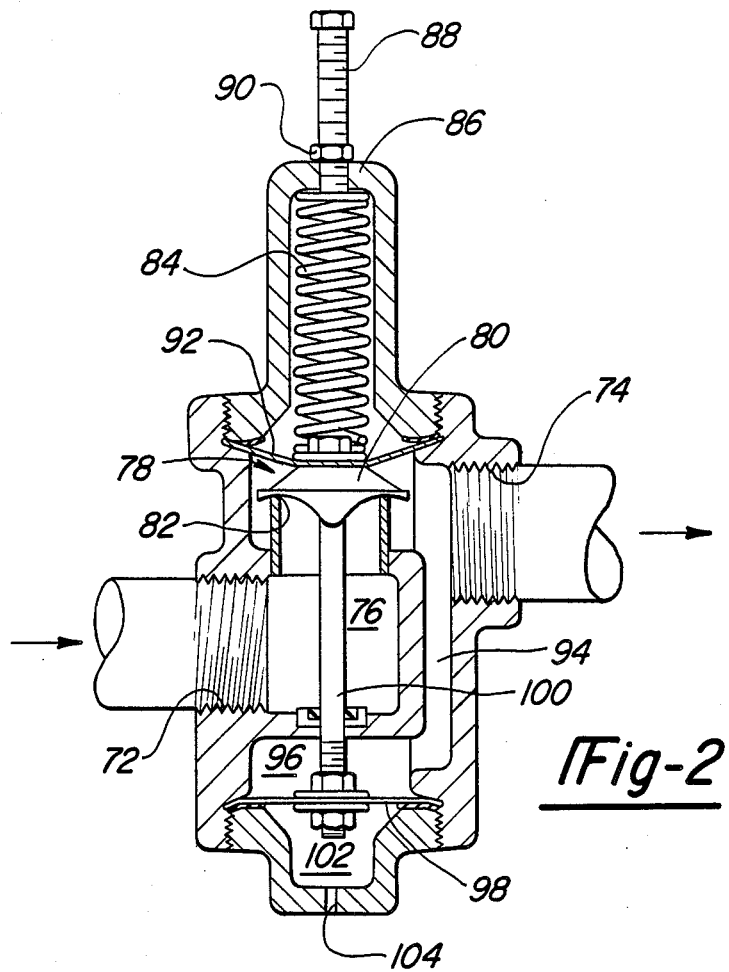
FIG. 2 is a cross-sectional perspective of the pressure differentiating bypass valve forming a part of the present invention.

Referring first to FIGS. 1 and 1A there is shown a water treatment system 10 for removing contaminants from a water supply before the water is supplied to the service. The treatment system 10 is designed to filter the water and improve its taste. The treatment system 10 includes a system 12 for mixing a controlled quantity of air into the water which embodies the present invention and is more clearly shown in FIG. 1A. The present invention is designed to entrain a sufficient amount of air into the water to facilitate removal of certain contaminants and any residual gases which may foul the water. However, it is to be understood that the present invention may be utilized for other applications to mix a controlled quantity of one fluid into a carrier fluid.

The water to be treated is delivered under pressure through inlet pipeline 14 through a strainer 16 to the main fluid inlet 18 of the mixing system 12. After a sufficient quantity of air is mixed with the water, the air/water mixture flows from main fluid outlet 20 to an aeration tank 22 where the excess air and any residual gases are vented from the treatment system 10. The air which is introduced into the water oxidizes and precipitates the contaminants therein. However, the excess air and other gases are vented through vent means 24.

If water is not immediately in demand, the air/water mixture from the aeration tank 22 flows into a pressure tank 26 which includes a pressure switch 28 and a pressure gage 30. The pressure tank 26 is designed to store water under pressure for subsequent use thereby preventing the pump from being run continuously. The pressure switch 28 ensures that the water is stored at a sufficient pressure. If water is demanded for service, the air/water mixture flows past the pressure tank 26 through pipe 32 into a filter tank 34.

The filter tank 34 includes a filter medium 36 formed of a mineral filter material and gravel. The primary purpose of the filter tank 34 is to trap contaminants which have become oxidized by the air entrained into the water. The oxidation process converts many of the dissolved contaminants to filterable suspended solids. As the water passes through the filter medium 36, the solid particles are trapped by the filter bed 36. Any of several known mineral filter materials may be utilized depending upon the expected contaminants which may be encountered in a particular geographic area. The filtered water flows through riser tube 38 through flow control device 40 into service for the user. The filter tank 34 is also provided with an auxiliary tube 42 to facilitate backwash and regeneration of the filter medium 36.

Referring now to FIG. 1A, the air/water mixture is created and controlled by the mixing system 12 embodying the present invention. The water flows from the main inlet 18 and can flow through either of two flow paths 50 and 52 to either a nozzle/venturi 54 or a pressure differentiating bypass valve 56, respectively. Although water will always flow through the nozzle/venturi 54, water will only flow through the bypass valve 56 when a predetermined back-pressure condition exists. Water flowing through the nozzle/venturi 54 will be mixed with air, as will be subsequently described, before flowing through the main outlet 20. At the main outlet 20, the bypass flow will join the fluid flow from the nozzle/venturi 54. The combined fluid flow will then pass through the remainder of the system 10 as has been previously described.

Figure 3:
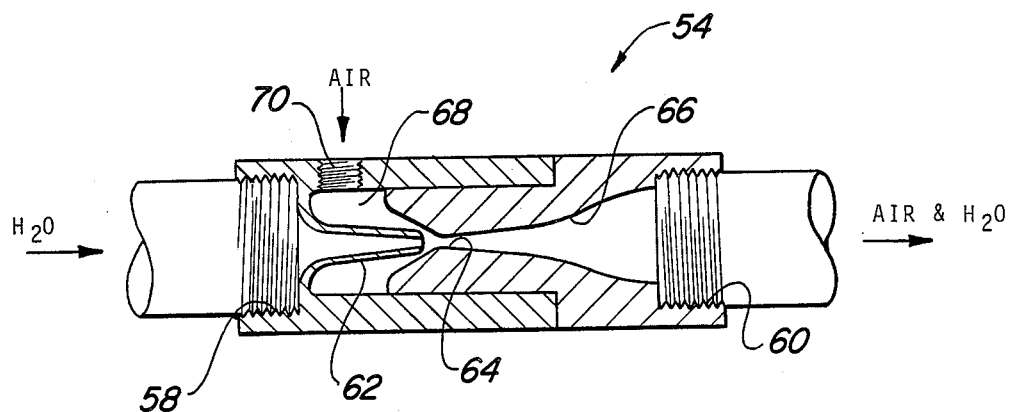
FIG. 3 is a cross-sectional perspective of the nozzle/venturi forming a part of the present invention.

Referring to FIG. 3, there is shown the nozzle/venturi 54 which has an inlet 58 through which the supplied water flows and an outlet 60 through which the air/water mixture flows. The water is directed from the inlet 58 through a converging cone 62. As the flow area is reduced, the fluid velocity is increased and pressure is reduced. The water flows through the nozzle/venturi throat 64 and into a diverging cone 66 which increases the flow area thereby decreasing the fluid velocity and increasing the pressure. As the low pressure fluid flows from the converging cone 62 to the venturi throat 64 a vacuum is created in the chamber 68. Outside air is drawn into the nozzle/venturi 54 through an air inlet 70 into the liquid stream. The air and water are then mixed as they flow through the diverging cone 66 and the air/water mixture flows through outlet 60 to main outlet 20.

Disposed in parallel arrangement with the nozzle/venturi 54 is the pressure differentiating bypass valve 56 such that fluid flow may be diverted through the bypass valve 56 depending upon the back pressure created by the nozzle/venturi 54. The bypass valve 56 and the nozzle/venturi 54 are shown in isolated arrangement although it is contemplated that the devices could be connected. The pressure differentiating bypass valve 56 generally includes an inlet 72 and an outlet 74 with a fluid passageway 76 disposed therebetween. A poppet valve 78 is disposed within the fluid passageway 76 to prevent or restrict fluid flow through the bypass valve 56. The poppet valve 78 includes a valve head 80 which cooperates with a valve seat 82 to restrict fluid flow. The valve head 80 is biased against the seat 82 by a spring 84 which extends between the valve head 80 and the upper housing wall 86. The compression force of the spring 84 can be adjusted in order to vary the fluid pressure needed to open the poppet valve 78. The spring force is adjusted by rotating bolt 88 to adjust the compression of the spring 84. A locknut 90 is also provided to maintain the bolt 88 in position. The spring 84 is isolated from the fluid passageway 76 by an upper diaphragm 92 which is connected to the valve head 80.

As water flows through the passageway 76 and the valve 78 to the outlet 74, the outlet pressure will increase causing water to flow through passage 94 into lower chamber 96. The lower chamber 96 includes a lower diaphragm 98 and as pressure within the chamber 96 varies the diaphragm 98 will be flexed accordingly. The lower diaphragm 98 is connected to the valve head 80 of the poppet valve 78 by a valve rod 100 which extends upwardly from the lower diaphragm 98 through the chamber 96 and passageway 76 to the valve head 80. In a preferred embodiment, the valve rod 100 provides a rigid connection between the lower diaphragm 98 and the valve head 80. An additional chamber 102 on the other side of lower diaphragm 98 which is vented to the atmosphere through opening 104 opposes the pressure exerted by the fluid within lower chamber 96.

The fluid pressure on the lower diaphragm 98 acts to close the poppet valve 78 through the valve rod 100. With the outlet fluid pressure acting on the larger lower diaphragm 98 an unbalanced condition always exists when water is flowing through the bypass valve 56. This unbalanced condition keeps the poppet valve 78 closed sufficiently to allow the inlet pressure to rise thereby ensuring sufficient fluid pressure to the nozzle/venturi 54. By adjusting the compressive force of the spring 84, the pressure differential can be maintained at the desired level. The bypass valve 56 maintains the desired pressure differential between the inlet and outlet valve pressures despite any pressure fluctuations on the outlet side of the bypass valve 56.

The pressure differentiating bypass valve 56 operates to maintain efficient operation of the nozzle/venturi 54. If the pressure differential between the inlet and outlet of the nozzle/venturi 54 decreases, eventually no air will be drawn into liquid stream. The bypass valve 56 serves two functions: first, the valve 56 bypasses any excess water flow that is above the maximum designed flow rate of the nozzle/venturi 54; second, the bypass valve 56 maintains the proper nozzle/venturi inlet/outlet pressure differential for efficient operation. As the fluid pressure at the main inlet 18 increases flow will divert to line 52 into the bypass valve 56. The pressure within the valve 56 will increase until the force of the spring 84 is overcome to open the poppet valve 78 permitting flow to the outlet 74 and into the chamber 96 which counteracts the fluid pressure through the poppet valve 78. The fluid flowing through outlet 74 joins the flow from the nozzle/venturi 54 at main outlet 20. The air/water mixture then flows through the remainder of the treatment system 10.

The foregoing detailed description has been given for clearness of understanding only and no unnecessary limitations should be understood therefrom as some modifications will be obvious to those skilled in the art without departing from the scope and spirit of the appended claims.

I claim:

1. A system for mixing a controlled quantity of an additive fluid into a carrier fluid having a variable fluid flow rate and fluid pressure, said system having a main fluid inlet and a main fluid outlet, said system comprising:
   a nozzle/venturi having a carrier fluid inlet, an additive fluid inlet and a fluid mixture outlet; and
   a selectively adjustable pressure differentiating bypass valve having a fluid inlet and a fluid outlet, said bypass valve selectively adjustable to vary the fluid pressure necessary to open said bypass valve, said bypass valve including poppet valve means comprising a valve head selectively sealingly cooperating with a valve seat, said poppet valve means including adjustable means for biasing said valve head against said valve seat such that the fluid pressure of said fluid inlet must exceed the force of said biasing means to open said poppet valve means permitting fluid flow through said bypass valve;
   said nozzle/venturi and said bypass valve disposed in parallel arrangement with said carrier fluid inlet of said nozzle/venturi and said fluid inlet of said bypass valve fluidly communicating with said main fluid inlet and with said fluid outlet of said nozzle/venturi and said fluid outlet of said bypass valve fluidly communicating with said main fluid outlet.

2. The system as defined in claim 1 wherein said nozzle/venturi includes a restricted flow axial passageway through which said carrier fluid flows, said additive fluid inlet communicating with said restricted flow passageway.

3. The system as defined in claim 2 wherein said carrier fluid is water and said additive fluid is air, said carrier fluid inlet introducing water into said restricted flow passageway and said additive fluid inlet introducing air by suction into said restricted flow passageway to mix air in the water, said air/water mixture flowing through said fluid mixture outlet.

4. The system as defined in claim 1 wherein said bypass valve includes a fluid passageway fluidly connecting said fluid inlet and said fluid outlet, said fluid passageway having said selectively adjustable poppet valve means disposed therein for selectively restricting fluid flow through said fluid passageway.

5. The system as defined in claim 4 wherein said biasing means is isolated from said fluid passageway by an upper diaphragm connected to said valve head.

6. The system as defined in claim 5 wherein said bypass valve further comprises a lower chamber fluidly communicating with said fluid passageway and said fluid outlet, said lower chamber disposed on the fluid outlet side of said poppet valve means.

7. The system as defined in claim 6 wherein said chamber includes a lower diaphragm, said lower diaphragm connected to said poppet valve head such that fluid pressure within said lower chamber acting on said diaphragm affects said valve head and the fluid pressure necessary to open said poppet valve means.

8. The system as defined in claim 7 wherein said lower diaphragm is connected to said poppet valve head by a valve rod.

9. The system as defined in claim 4 wherein said biasing means comprises a spring extending between said valve head and the housing wall of said bypass valve, the compression force of said spring being adjustable to vary the fluid pressure necessary to open said poppet valve means.

10. The system as defined in claim 1 wherein said bypass valve is isolated from said nozzle/venturi, said bypass valve and said nozzle/venturi being disposed in separate fluid pipelines, said separate fluid pipelines connected to said main fluid inlet and said main fluid outlet.

11. The system as defined in claim 10 wherein the fluid flow through said bypass valve is related to the fluid flow through said nozzle/venturi.

12. A system for mixing a controlled quantity of air into a liquid flow having a variable fluid flow rate and fluid pressure, said system having a main water inlet and a main water outlet, said system comprising:
   a nozzle/venturi having a water inlet, an air inlet and an air/water mixture outlet; and
   a selectively adjustable pressure differentiating bypass valve having an inlet, an outlet and a fluid flow passageway therebetween, said bypass valve selectively adjustable to vary the fluid pressure necessary to open said bypass valve;
   said nozzle/venturi and said bypass valve disposed in isolated parallel arrangement with said water inlet of said nozzle/venturi and said inlet of said bypass valve fluidly communicating with said main water inlet and with said mixture outlet of said nozzle/venturi and said outlet of said bypass valve fluidly communicating with said main water outlet; and
   said bypass valve including poppet valve means for selectively restricting fluid flow through said passageway in accordance with the pressure differential between said water inlet and said mixture outlet of said nozzle/venturi, said poppet valve means including a valve seat, said valve head connected to adjustable means for biasing said valve head against said valve seat to vary the amount of air entrained into the water to form the air/water mixture.

13. The system as defined in claim 12 wherein said biasing means comprises a compression spring extending between said valve head and the housing wall of said bypass valve, said spring including means for selectively adjusting the compression force thereof thereby varying the fluid pressure necessary to open said poppet valve means.

14. The system as defined in claim 13 wherein said bypass valve further comprises a lower chamber fluidly communicating with said fluid passageway and said fluid outlet, said lower chamber disposed on the fluid outlet side of said valving means.

15. The system as defined in claim 14 wherein said chamber includes a lower diaphragm, said lower diaphragm connected to said poppet valve head by a valve rod such that fluid pressure within said chamber acting on said diaphragm affects said valve head and the fluid pressure necessary to open said valving means.

16. The system as defined in claim 12 wherein the fluid flow through said bypass valve is related to the fluid flow through said nozzle/venturi.

17. A system for removing contaminants from water comprising:
   means for entraining air into the water, said means including a selectively adjustable pressure differentiating bypass valve for controlling the pressure differential between an inlet and an outlet of said means to continuously adjust the amount of air entrained into the water under varying water flow rates and pressures across said means;
   an aeration tank having an inlet fluidly communicating with said air entraining means, said aeration tank including vent means to release gases; and
   a filter tank having a filter medium and fluidly communicating with said aeration tank, the water passing through said filter medium to filter contaminants from the water, the filtered water being delivered to service;
   said bypass valve including adjustably biased valving means to selectively control the water flow through said bypass valve and said air entraining means to selectively control the air entrained into the water.

18. A system for mixing a controlled quantity of air into a liquid flow having a variable flow rate and fluid pressure, said system having a main water inlet and a main water outlet, said system comprising:
   a nozzle/venturi having a water inlet, an air inlet and an air/water mixture outlet; and
   a pressure differentiating bypass valve having an inlet, an outlet and a fluid flow passageway therebetween;
   said nozzle/venturi and said bypass valve disposed in parallel arrangement with said water inlet of said nozzle/venturi and said inlet of said bypass valve fluidly communicating with said main water inlet and with said mixture outlet of said nozzle/venturi and said outlet of said bypass valve fluidly communicating with said main water outlet; and
   said bypass valve including poppet valve means for selectively restricting fluid flow through said passageway in accordance with pressure differential between said water inlet and said water outlet of said nozzle/venturi, said poppet valve means including a valve head selectively cooperable with a valve seat to restrict fluid flow through said fluid passageway and a compression spring including means for selectively adjusting the compression force biasing said valve head towards said valve seat to vary the fluid pressure necessary to open said poppet valve means.

19. The system as defined in claim 18, wherein said compression spring extends between said valve head and the housing wall of said bypass valve.

20. The system as defined in claim 19 wherein said bypass valve further comprises a lower chamber fluidly communicating with said fluid passageway and said fluid outlet, said lower chamber disposed on the fluid outlet side of said valving means.

21. The system as defined in claim 20 wherein said chamber includes a lower diaphragm, said lower diaphragm connected to said poppet valve head by a valve rod such that fluid pressure within said chamber acting on said diaphragm affects said valve head and the fluid pressure necessary to open said valving means.

22. The system as defined in claim 18 wherein the fluid flow through said bypass valve is related to the fluid flow through said nozzle/venturi.

23. A system for mixing a controlled quantity of an additive fluid into a carrier fluid having a variable fluid flow rate and fluid pressure, said system having a main fluid inlet and a main fluid outlet, said system comprising:
   a nozzle/venturi having a carrier fluid inlet, an additive fluid inlet and a fluid mixture outlet; and
   a pressure differentiating bypass valve having a fluid inlet, a fluid outlet, and a fluid passageway fluidly connecting said fluid inlet and said fluid outlet, said fluid passageway having poppet valve means disposed therein for selectively restricting fluid flow through said fluid passageway, said poppet valve means including a valve head selectively sealing cooperating with a valve seat, said valve head connected to adjustable means for biasing said valve head against said valve seat;
   said nozzle/venturi and said bypass valve disposed in parallel arrangement with said carrier fluid inlet of said nozzle/venturi and said fluid inlet of said bypass valve fluidly communicating with said main fluid inlet and with said fluid outlet of said nozzle/venturi and said fluid outlet of said bypass valve fluidly communicating with said main fluid outlet.

24. The system as defined in claim 23 wherein said adjustable biasing means is isolated from said fluid passageway by an upper diaphragm connected to said valve head.

25. The system as defined in claim 24 wherein said adjustable biasing means comprises a spring extending between said valve head and the housing wall of said bypass valve, the compression force of said spring being adjustable to vary the fluid pressure necessary to open said poppet valve means.

26. The system as defined in claim 25 wherein said bypass valve further comprises a lower chamber fluidly communicating with said fluid passageway and said fluid outlet, said lower chamber disposed on the fluid outlet side of said poppet valve means.

27. The system as defined in claim 26 wherein said chamber includes a lower diaphragm, said lower diaphragm connected to said poppet valve head such that fluid pressure within said lower chamber acting on said diaphragm affects said valve head and the fluid pressure necessary to open said poppet valve means.

28. The system as defined in claim 27 wherein said lower diaphragm is connected to said poppet valve head by a valve rod.

* * * * *